Jan. 21, 1947.  G. A. DUNN  2,414,584
FRUIT TRANSFER MEANS
Original Filed Sept. 9, 1940  7 Sheets-Sheet 5
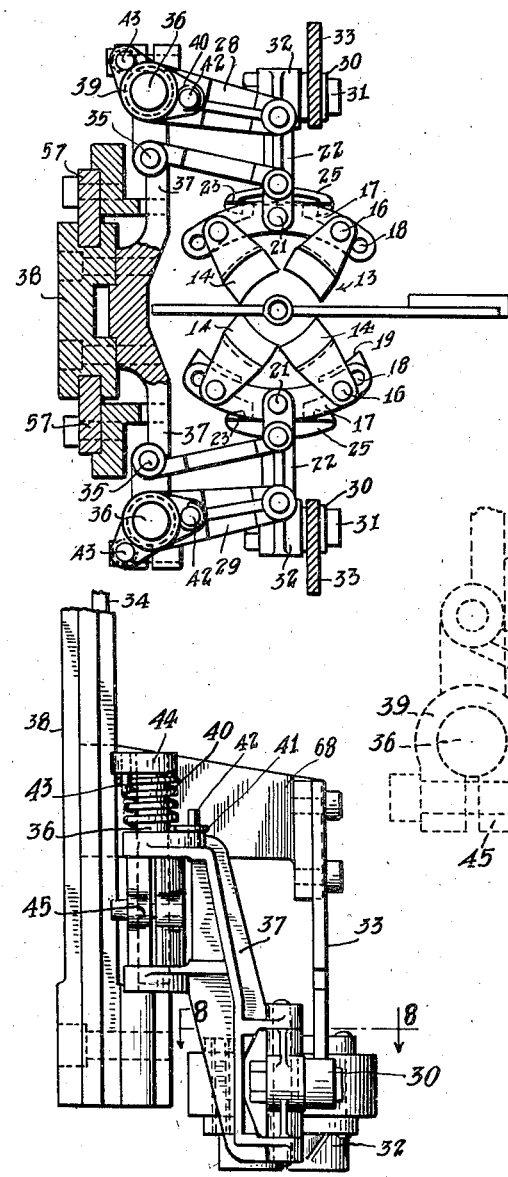
Fig. 6
Fig. 7
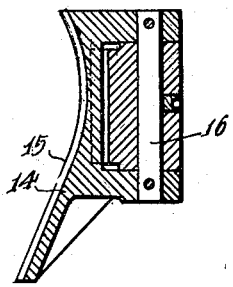
Fig. 9
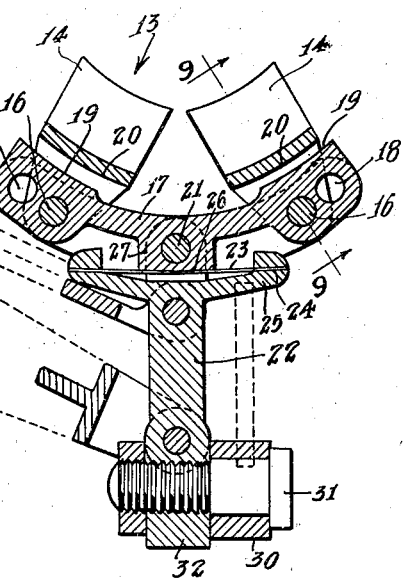
Fig. 8
Inventor
Guy A. Dunn
By Lyon & Lyon
Attorneys

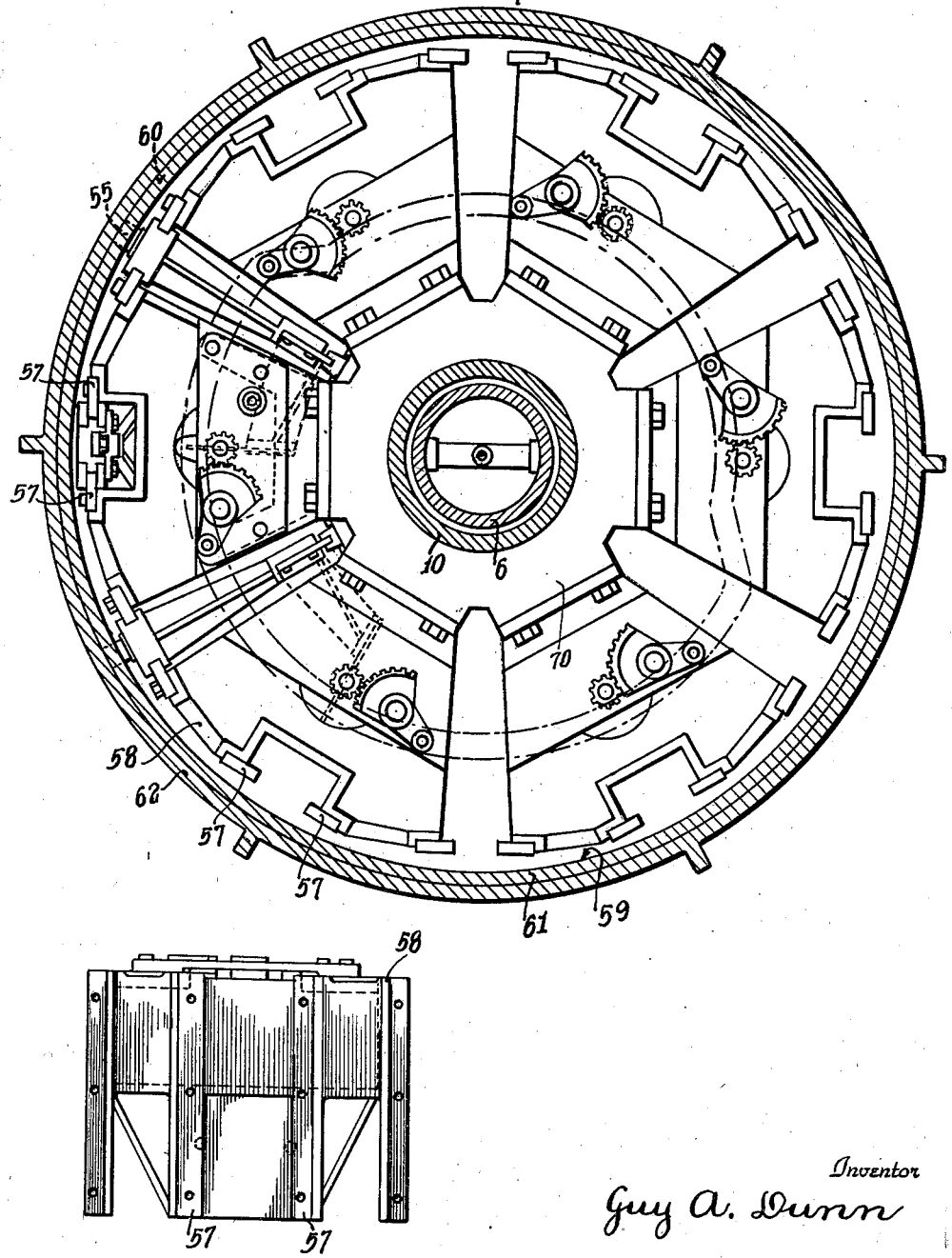

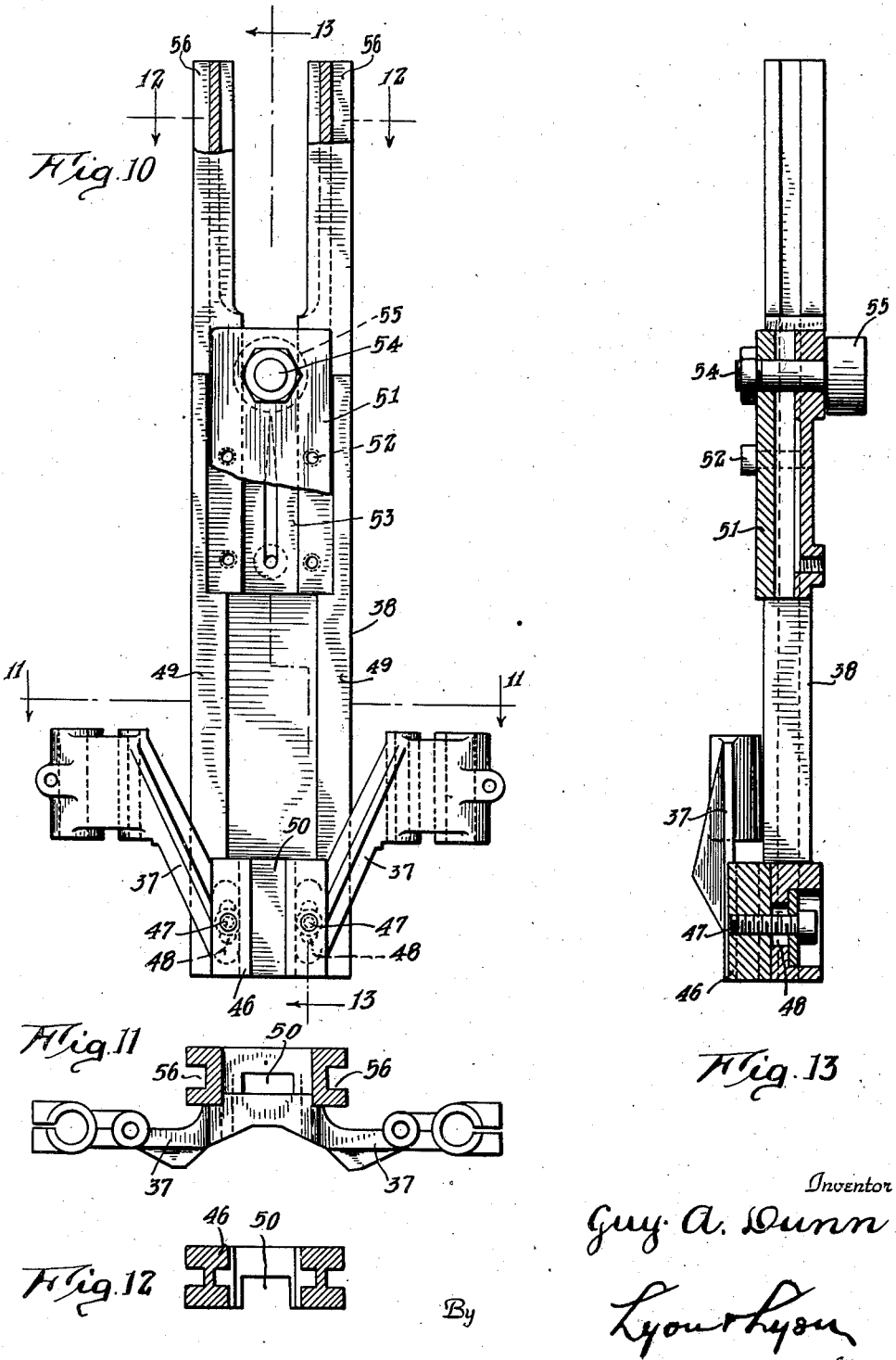

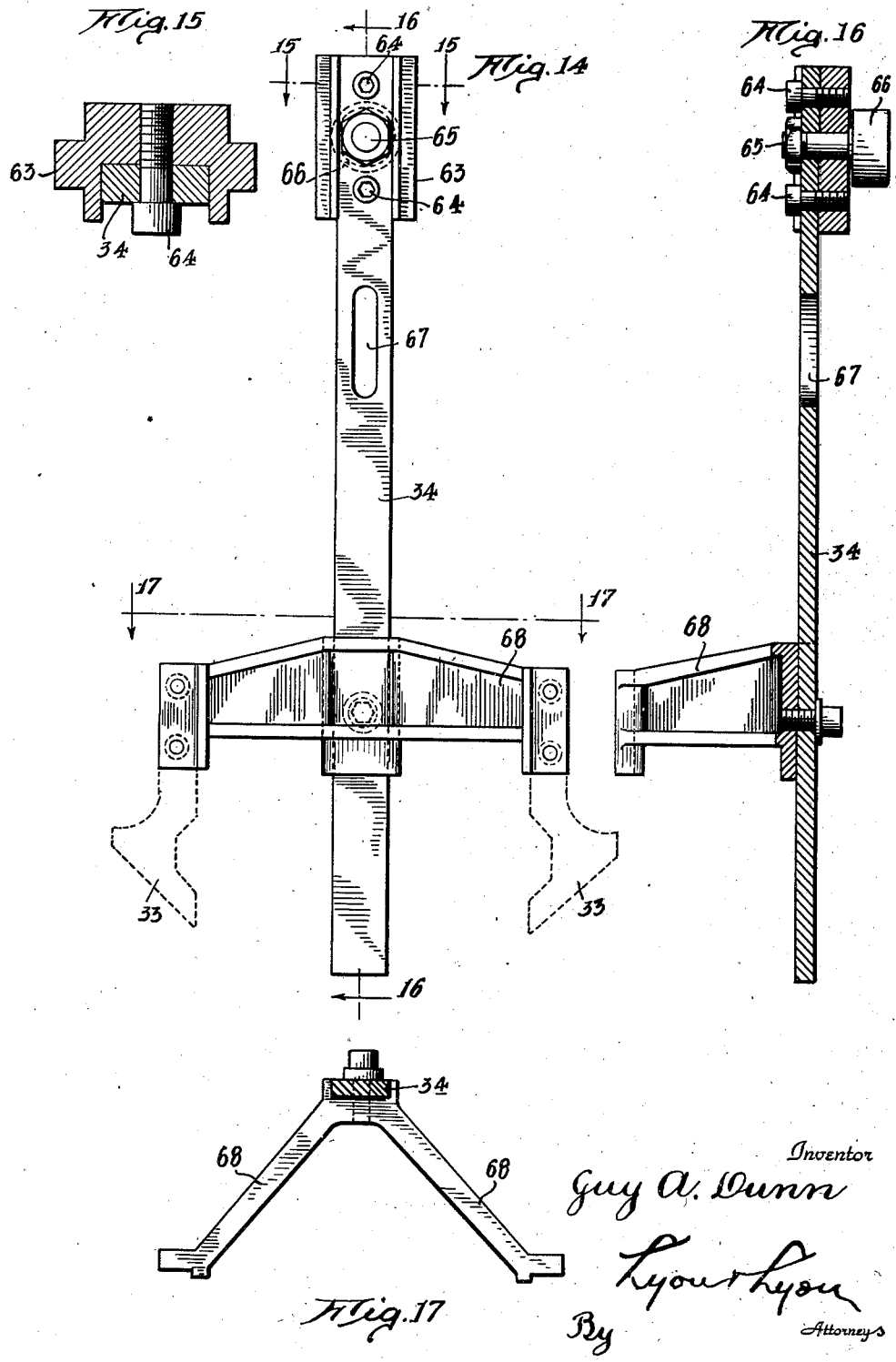

Patented Jan. 21, 1947

2,414,584

UNITED STATES PATENT OFFICE 2,414,584

FRUIT TRANSFER MEANS

Guy A. Dunn, Oakland, Calif., assignor to California Packing Corporation, San Francisco, Calif., a corporation of New York Original application September 9, 1940, Serial No. 355,988. Divided and this application August 20, 1943, Serial No. 499,373

7 Claims. (Cl. 146—33)

1

This invention relates to a fruit transfer means, and more particularly to a means for transferring fruit such as pears from one position to another in a continuously operating pear preparation machine.

This application is a division of my copending application, Serial No. 355,988, filed September 9, 1940, for Pear peeling machine.

It is an object of this invention to provide a transfer means operable for transferring fruit from one position to another in a continuously operating machine so that a series of operations may be performed upon the pear in the preparation thereof for canning or other allied uses.

Another object of this invention is to provide a means applicable to grip or support the pear so that it will be maintained in the position in which it is gripped and transferred while in such position through a series of operations in such manner that the position and alignment of the fruit is maintained throughout the series of operations performed on the fruit during such transfer.

Another object of this invention is to provide a transfer means operable in a continuously operating preparation machine for transferring a pear from its predetermined position within a peeling unit to a position with relation to a coring or seed-pod-removing unit, and which transfer means are operable to maintain the pear in position of transfer along an axial line containing the stem fibres of the pear.

Another object of this invention is to provide a fruit transfer means which includes a pear of contoured gripping members which are adapted to accommodate themselves to the contour of a pear, means for actuating the contour members to yieldably urge the same into a pear-clamping position, and means for moving the said clamping means through a predetermined path to position the fruit in predetermined relation for the performance of a second preparation operation thereon.

Other objects and advantages of this invention it is believed will be apparent from the following detailed description of a preferred embodiment thereof as illustrated in the accompanying drawings.

2

Figure 1:
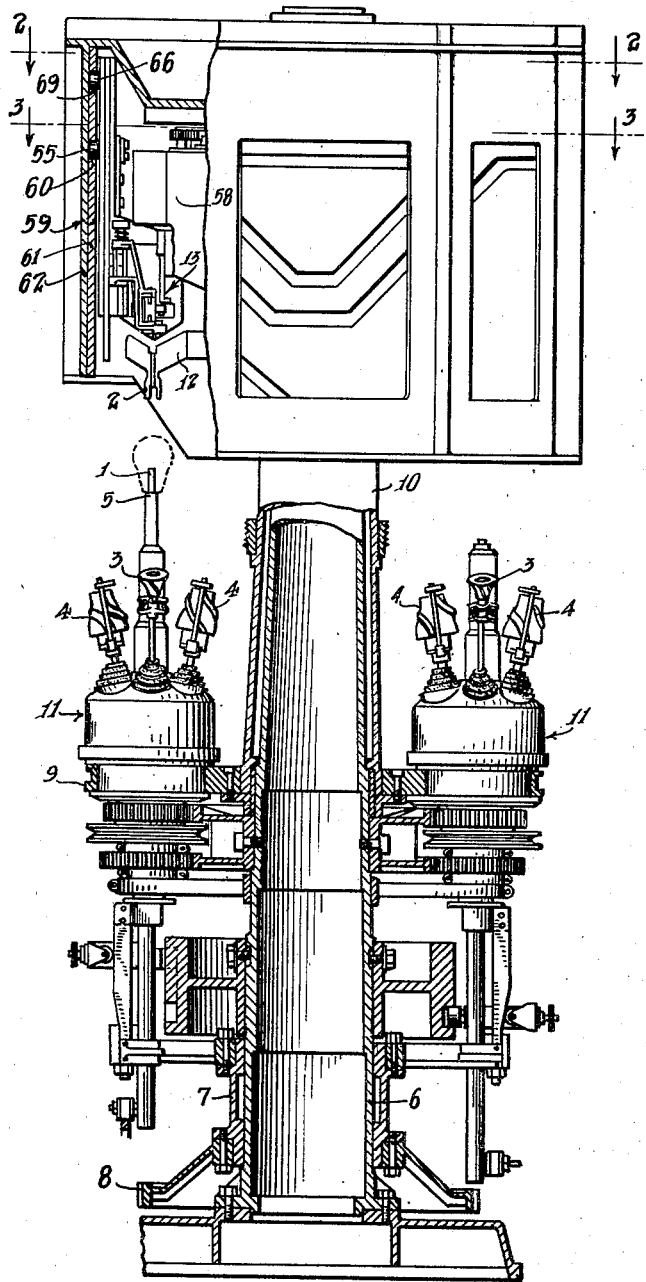
Figure 1 is a partial elevation partially in vertical section of a fruit preparation machine embodying my invention.
Figure 2:
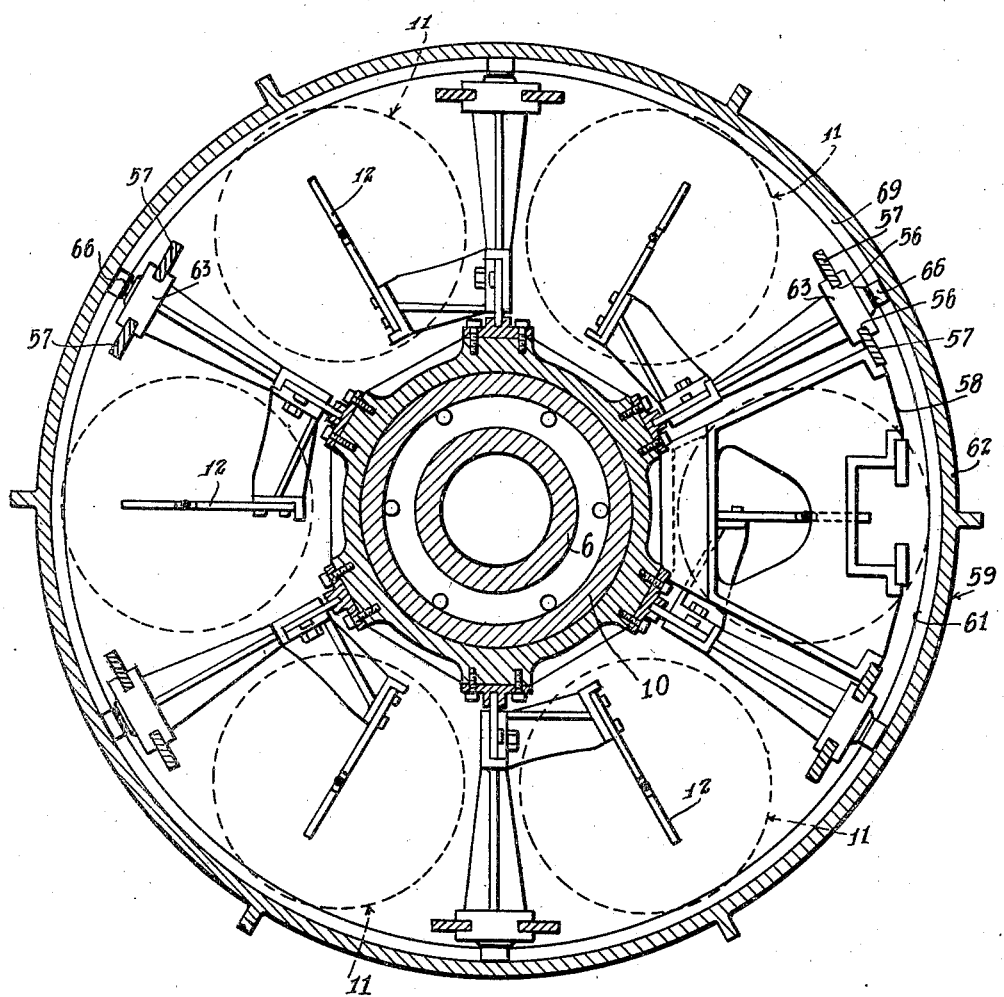
Figure 2 is a sectional end elevation taken substantially on the line 2—2 of Figure 1.

Figure 3 is a sectional end elevation taken substantially on the line 3—3 of Figure 1.

Figure 4 is a detached elevation of the slide bracket.

Figure 5:
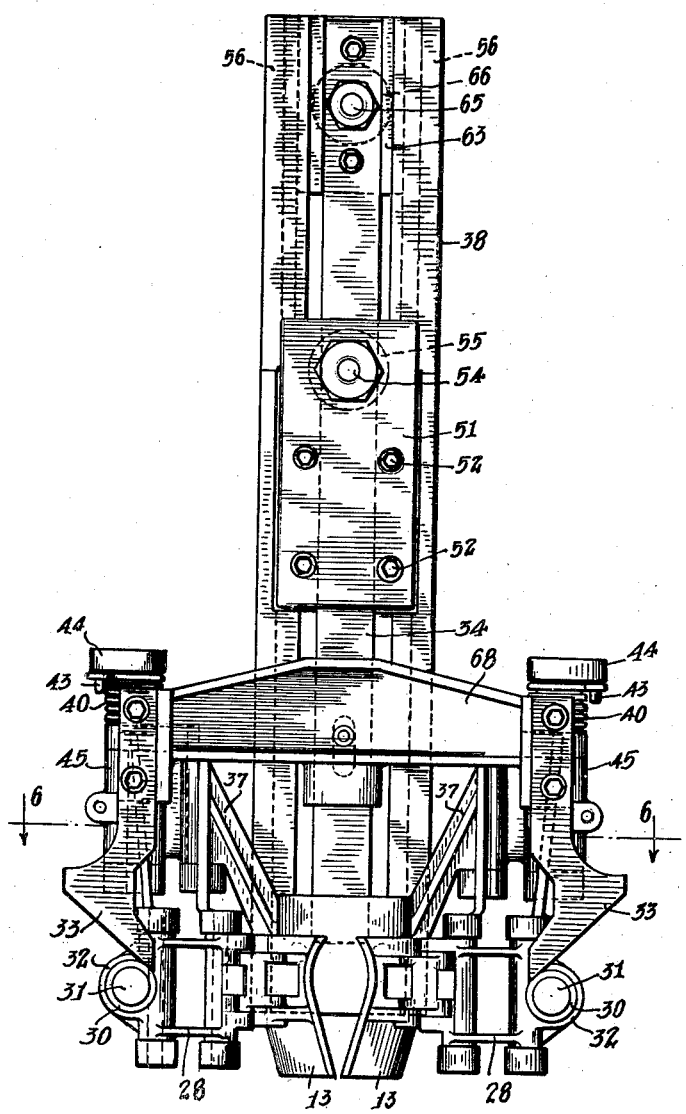

Figure 5 is a front elevation of the transfer assembly embodying my invention.

Figure 6 is a sectional end view taken substantially on the line 6—6 of Figure 5.

Figure 7 is a side elevation of the transfer assembly.

Figure 8 is a sectional plan view taken substantially on the line 8—8 of Figure 7 on an enlarged scale showing one of the clamp members in open position and showing the actuating linkage therefor in dotted lines.

Figure 9 is a sectional edge elevation of one of the clamp members taken substantially on the line 9—9 of Figure 8.

Figure 10 is a front elevation of the slide bracket.

Figure 11 is a sectional plan view taken on the line 11—11 of Figure 10.

Figure 12 is a sectional plan view taken on the line 12—12 of Figure 10.

Figure 13 is a sectional edge elevation taken on the line 13—13 of Figure 10.

Figure 14 is an elevation of the cam actuating slide.

Figure 15 is a sectional end elevation taken substantially on the line 15—15 of Figure 14.

Figure 16 is a sectional edge elevation taken substantially on the line 16—16 of Figure 14.

Figure 17 is a sectional plan view taken substantially on the line 17—17 of Figure 14.

In the preferred embodiment of my invention as herein illustrated, I have shown the fruit transfer means embodying my invention as incorporated in a pear preparation machine which may be of the form disclosed in my parent application hereinabove referred to. In this machine there is a main operating turret in which the fruit to be prepared is supported upon a stemming tube 1 and is held from rotation by means of an impaling blade 2 while being pealed by means of upper and lower peeling cutters 3 and 4, respectively. The pear is held on the stemming tube 1 against endwise movement by means of an end collar 5 which positions the pear with relation to its seed-pod.

The working turret includes a stationary column 6 upon which there is rotatably mounted a spider 7 to which is secured a driving gear 8 driven from any suitable source. The spider 7 is operatively connected with a peeling plate 9 which is journaled upon the stationary column 6 so that the peeling plate 9 revolves with the spider 7.

The particular connecting means may be of any suitable form as, for example, a plurality of posts (not shown).

Carried by the peeling plate 9 is an outer quill shaft or column 10. Carried by the peeling plate 9 are a plurality of peeling heads 11 through the medium of which the upper and lower cutters 3 and 4 are revolved and actuated to peel the fruit as it is impaled upon the stemming tube 1 and as the working turret is continuously rotated.

As set forth in my parent application, the impaling blade 2 may be carried by a splitting blade 12, the function of which is to divide the fruit into halves after it is peeled and as it is transferred off from the stemming tube 1 to a position over a coring plate (not shown) which carries means for cutting the seed-pod from the pear halves and for trimming the calyx end of the pear.

The transfer of the pear from the stemming tube 1 to its position on the coring plate (not shown) must be accomplished so as to maintain the position of the pear with respect to its seed cavity as is established on the stemming tube 1 by the positioning of the collar 5.

The transfer means are also operative and carry the fruit across the splitting blade 12 to split the fruit into halves and to position the fruit on the coring plate during the continuous operation of the working turret and as the quill shaft 10 is continuously rotated.

The transfer means includes a pair of contoured pear-engaging clamps 13 which are preferably of the following construction: Each of the clamps 13 includes a pair of preformed engaging members 14, the inner engaging surface 15 of which is contoured of general or average outline of the fruit to be engaged. Each of the members 14 is carried on a supporting pin 16 mounted within a bore formed in the arcuate supporting arm 17. As illustrated, two such bores 18 are provided in each end of the arm 17 in order to permit adjustment of the position of the engaging members 14 depending upon the size of the fruit being processed. The members 14 have limited pivotal movement around their pivot 16, limited by the surface 19 of the arm 17 engaging the arcuate surface 20 of the members 14.

The arcuate arms 17 are pivotally mounted on supporting pins 21 carried at the ends of the links 22. In order to yieldably control pivotal movement of the arcuate arm 17, a flat spring 23 is carried at its ends within recesses 24 formed in the fork 25 of the links 22 and the springs 23 are engaged intermediate their ends against the flat surface 26 of the pin-receiving boss 27 of the arms 17.

The links 22 are supported so as to have a diametrical movement with relation to the center within the area formed by the contoured faces 15 of the engaging members 14 and are thus supported by parallel links 28 and 29, respectively. The links 22 carry at their outer ends cam rollers 30 supported by cam shafts 31 mounted within the bosses 32. The cam rollers 30 are adapted to be engaged by the cams 33 carried by cam slides 34. The cam rollers 30 and cams 33 are operable as will hereinafter be set forth to urge the clamp members 13 apart away from the fruit.

Means are provided for yieldably urging the clamp members 13 into fruit-engaging position, which means as herein illustrated includes the following: The parallel links 28 and 29 are supported on pins 35 and 36 mounted in spaced relationship on the outer ends of the arms 37 of the slide bracket 38. The pins 36 extend above their supporting bosses 39 and torsion springs 40 are mounted thereon. One end 41 of the torsion spring 40 engages a pin 42 carried by the link 29, while the other end engages a pin 43 carried by a collar 44 secured to the projecting end of the pin 36. The pin 36 is held stationary by means of a clamp 45.

The arms 37 are formed outwardly extending from a guide bracket 46 which is secured to the lower end of the slide bracket 38 by means of spaced bolts 47 which pass through elongated slots 48 formed in the side rails 49 of the slide bracket 38. The guide bracket 46 provides a guide way 50 through which the cam slide 34 extends. Carried between the side rails 49 are center slide-retaining plates 51 which are held in position by means of cap screws 52. These retaining plates are also formed to provide a guideway 53 for the cam slide 34.

Carried by the plates 51 is a cam bolt 54 which carries the slide bracket actuating cam roller 55. The rails 49 are recessed to provide slide ways 56 in which the guide bars 57 of the main turret guide bracket 58 fit. The guide bracket 58 is supported within the interior of the cam cylinder 59 and is supported from the rotating shaft 10 of the operating turret to revolve therewith. The cam roller 55 is adapted to ride in a cam groove or way 60 formed in the cam cylinder 61. The cam cylinder 61 is supported within the operating turret cover cylinder 62. The cylinder 62 is supported upon the upper end of the stationary column 6 and is held stationary.

By means of the cam way 60 the slide bracket 38 is raised and lowered to carry clamp members 13 down to a position where the clamp members 13 may grip the pear as it is supported upon the stemming tube 1 and raise the pear over the splitting blade 12 to split the pear into halves and to elevate the pear off from the blade 12 to position the same over the coring plate where the seed-pod of the two separated halves may be removed.

The cam actuating slide 34 carries at its upper end a guide bracket 63 which is adapted to fit between the rails 49 of the slide bracket 38. The bracket 63 is secured to the upper end of the cam slide 34 by means of a pair of spaced bolts 64 and also carries a cam shaft 65 upon which the cam roller 66 is journaled.

The slide 34 is formed with an elongated slot 67 through which the camshaft 54 extends. The cam slide 34 carries at its lower end a yoke 68 to the outer ends of which is secured the cam plates 33.

The cam roller 66 is adapted to ride in a cam way 69 formed in the cam cylinder 59. The cam way 69 is formed so as to actuate the cam plates 33 to cause the clamps 13 to open after the coring operation has been completed and to retain the clamps 13 in their open position during the descent of the slide bracket 38 and until the clamps 13 are positioned adjacent a fruit carried upon the stemming tube 1 when the cam plates 33 are retracted to permit the torsion springs 40 to move the clamps 13 in position to clamp the fruit supported upon the stemming tube 1.

As illustrated in Figure 3, the stationary guide bracket 58 is supported upon a spider 70 which is in turn secured to the rotating column 10.

The fruit transfer means embodying my invention is particularly adapted for the transferring of fruit from one operating mechanism to another while holding the fruit in definite position so that the fruit will be delivered to the second operating mechanism in a predetermined position. In the particular modification shown, the fruit, i. e., a pear, has been impaled upon a stemming tube 1 and while so impaled it is peeled by the cutters 3 and 4 (see application Serial No. 355,988, supra). The pear is then transferred over the splitting blade 12 to a coring mechanism, as described in my parent application.

While the turret is revolving around the column 6, and when the peeling head, including the cutters 3 and 4, reaches the predetermined position with relation to the stationary cam cylinder 59, the cam roller 55 operating in the cam way 60 lowers the clamp members 13 to the position where the clamps 13 may grip the pear held on the stemming tube 1. At this time, due to the action of the cam roller 66 within cam way 69 the clamps 13 are moved apart as the slide 34 is depressed to thrust the cams 33 against the rollers 30 to spread the clamps 13 in opposition to the action of the springs 40. When the clamps 13 are lowered to the pick out position, the cam roller 66 operating in the way 69 raises the slide 34, detracting the cams 33 from position to spread the clamps 13. The clamps 13 are then urged together by the springs 40. As the clamps 13 engage the fruit, they adjust themselves to the contour of the fruit as they pivot around their supporting pins 16 and 21 under the influence of the leaf spring 23. As the fruit is at this time supported from within on its stem axis, the spring pressure exerted on the clamps 13 can not alter the position of the fruit. When the clamps 13 have engaged the fruit and the fruit is gripped by the preformed engaging members 14, the slide bracket 38 and slide 34 are raised together by the action of the rollers 66 and 55 in the ways 69 and 60, respectively. The fruit is then raised away from the peeling unit and passed over the splitting blade 12, split into halves and is then raised to a coring position.

The coring operation is fully described in my copending application, Serial No. 355,988, and need not be repeated here.

After the fruit is cored, the clamps 13 are retracted from the fruit permitting the peeled, halved, stemmed and cored fruit halves to discharge from the machine.

Having fully described my invention, it is to be understood that I do not wish to be limited to the details herein set forth, but my invention is of the full scope of the appended claims.

I claim:

1. In combination with a pear preparing machine of a clamping assembly having parallel vertical guide bars therein, a frame slidably disposed on said vertical guide bars, a roller secured to said frame, a clamp cam track fixed to said machine and arranged for the rotation therein of said roller, whereby vertical displacements of said frame are obtained in accordance with the configuration of said clamp cam track, a clamping finger frame fixed to said slidably disposed frame, opposed pairs of clamping fingers pivotally mounted on said clamping finger frame, means disposed on said clamping finger frame for urging said opposed pairs of clamping fingers toward each other, and a clamping finger cam roller associated with each pair of clamping fingers; a clamping finger-controlling cam-supporting bar slidably disposed within said frame, a clamping finger-controlling cam roller rotatably mounted on said bar, a finger-controlling cam bracket fixed to said bar, cams fixed to said bracket and arranged to force said clamping finger rollers outwardly when downwardly displaced in contact therewith, and a cam track formed in said machine arranged for the travel therein of said clamping finger-controlling cam roller, whereby as movement of said clamping unit occurs relative to said clamp cam track, said clamping unit may be vertically displaced and said clamping fingers may be opened and closed at predetermined points during said rotation.

2. A clamping unit for use in a pear preparing machine arranged to grasp said pear on opposite sides of a splitting blade and to elevate said pears into engagement with opposite sides of a splitting plate and coring unit while maintaining the initial alignment between the separated pear halves, comprising a clamp-supporting frame slidably mounted on guide ways within said pear preparing machine, a clamping finger bracket secured to said frame, opposed pairs of clamping fingers pivotally secured to said bracket and arranged to grasp said pear while drawing it over splitting means; resilient means for forcing said clamping fingers together, and a cam roller associated with each of said opposed pairs of fingers; a cam-supporting frame slidably disposed within said clamp-supporting frame, a cam bracket fixed to said cam-supporting frame, a pair of cam surfaces fixed to said cam bracket and arranged to engage said cam rollers on said clamping finger bracket, a clamping finger-opening cam roller rotatably mounted on said cam-supporting frame, a clamping unit-displacing cam roller rotatably secured to said clamp-supporting frame, said unit-displacing cam roller and said clamping finger-opening roller being arranged to travel within cam tracks formed in said pear preparing machine, whereby said clamping unit may be vertically displaced while holding said pear, and said clamping fingers may be released from said pear at predetermined points during the operation of the machine.

3. In a pear preparing machine having a peeling station and a coring station above the peeling station and vertically aligned therewith, means for transferring a pear from said peeling station to said coring station and for separating the pear into halves during such transfer, comprising a splitting blade disposed in vertical alignment with said peeling station and said coring station, a clamping unit arranged to grasp the pear at said peeling station, means for simultaneously elevating said clamping unit and a splitting blade, and means for elevating said clamping unit beyond said splitting blade, whereby a pear may be halved by passage over said splitting blade and raised into alignment with said coring station.

4. In a pear preparing machine, a rotating turret having a plurality of vertically aligned pear preparing sections disposed thereabout, wherein each of said sections comprises vertically aligned peeling and coring stations, means for raising a pear from said peeling station to said coring station and for halving said pear during rotation of said turret, comprising a clamping unit slidably disposed within said turret, an impaling and splitting blade assembly slidably disposed within said turret, said impaling and splitting unit comprising an impaling blade arranged to be forced into the large end of a pear and a splitting blade formed integrally with said impaling blade and arranged to pass entirely through said pear when said pear is drawn upwardly relative thereto by said clamping unit and to remove the upper stem fibres therefrom during such passage; said clamping unit comprising opposed pairs of clamping fingers arranged to grasp a pear from opposite sides of said splitting blade and to maintain the original alignment of the pear halves as they draw the pear thereover to the coring station.

5. In combination with a pear preparing machine having a peeling station and a coring station disposed in vertical alignment, means for transferring a pear from said peeling station to said coring station comprising a pair of opposed clamping fingers pivotally secured to a clamping finger bracket, said bracket being mounted on a clamping frame slidably disposed within said machine and arranged for vertical travel between said peeling and coring stations, a pair of bracket arms associated with said clamping frame, inner and outer bracket arms pivotally connected to said main frame and arranged to maintain said clamping fingers in a desired alignment regardless of the position of said pivotally mounted arms, a cam roller associated with each of said clamping fingers, and resilient means arranged to urge said opposed pairs of clamping fingers toward each other; an auxiliary frame vertically slidable within said clamping frame, cam bracket arms fixed to said auxiliary frame, and cams fixed to said cam bracket arms and arranged to engage said cam rollers, whereby a downward vertical displacement of said auxiliary frame relative to said clamping frame will engage said cams with said cam rollers to separate said opposed pairs of clamping fingers; a cam roller fixed to said clamping frame and arranged to be controlled by a clamping cam track formed within said machine, and a cam roller rotatably mounted on said auxiliary frame and arranged to travel in a clamps cam track formed within said machine, whereby movement of said stations along said clamping and clamps cam track within said turret will raise said clamping fingers from said peeling station to said coring station and subsequent downward displacement of said auxiliary frame will separate said clamping fingers at the conclusion of the coring station operation.

6. In combination in a fruit preparation machine having means for carrying out successive operations upon a fruit, of a transfer means adapted to transfer the fruit from one operation to another, said transfer means comprising two pairs of clamping fingers movably supported by a bracket, means yieldably urging the pairs of clamping means toward each other, a slide carried by the bracket, cam means carried by the slide adapted to engage cooperating elements carried by the bracket to hold the pairs of clamping fingers apart against said urging means, means for moving the bracket, slide and clamping fingers in position to pick up the fruit from one operation and to transfer the fruit to a second operation, means for moving the slide to pickup position to retract the cam members whereby the fingers are yieldably urged together to engage the fruit, the clamping fingers being contoured and being pivotally supported for limited movement upon opposed arcuate arms, and the arcuate arms in turn being pivotally supported by link members supported by the bracket, and having spring means for resisting pivotal movement of the arcuate arms with relation to said link members.

7. In combination in a pear preparation machine having means for carrying out successive operations upon a fruit, of a transfer means adapted to transfer the fruit from one operation to another, said transfer means comprising cam means having spaced camways therein, a slide frame, a cam roller carried by the slide frame whereby the frame is moved, two pairs of clamping fingers movably supported by the slide frame, means yieldably urging the pairs of clamping fingers toward each other, a slide carried by the slide frame, a cam roller carried by the latter slide and adapted to cooperate with one of the camways of the cam means whereby the latter slide is moved relatively to the slide frame and in timed relation with the movement of the slide frame, and means interposed between the slide and the clamp fingers for moving the pair of clamp fingers apart against said urging means whereby the fruit is picked up from one operation and transferred to a second operation, the clamping fingers being contoured and being supported in pairs for limited movement upon opposed arcuate arms, and the arcuate arms being pivotally supported with relation to the slide frame and having spring means for resisting pivotal movement of the arcuate arms with relation to said slide frame.

GUY A. DUNN.